(12) United States Patent
Nishihara et al.

(10) Patent No.: US 8,051,631 B2
(45) Date of Patent: *Nov. 8, 2011

(54) REAR DISCHARGE MOWER

(75) Inventors: Kenji Nishihara, Sakai (JP); Takashi Kuramoto, Sakai (JP); Masashi Osuga, Nara (JP); Takashi Shibata, Sakai (JP); Satoshi Ogata, Sakai (JP); Hironobu Nishihara, Sakai (JP); Hiroshi Kawabata, Sakai (JP)

(73) Assignee: Kubota Corporation, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/051,815

(22) Filed: Mar. 19, 2008

(65) Prior Publication Data

US 2008/0276588 A1 Nov. 13, 2008

(30) Foreign Application Priority Data

May 11, 2007 (JP) .................................. 2007-126948

(51) Int. Cl.
*A01D 34/66* (2006.01)

(52) U.S. Cl. .................. 56/6; 56/17.5; 56/255

(58) Field of Classification Search ............... 56/6, 13.3, 56/13.5–13.8, 14.8, 16.6, DIG. 4, DIG. 6, 56/17.5, 320.1, 255
See application file for complete search history.

(56) References Cited

U.S. PATENT DOCUMENTS

| 1,656,105 | A | * | 1/1928 | Durkee | 56/13.6 |
| 3,028,719 | A | * | 4/1962 | Jepson | 56/295 |
| 3,152,431 | A | * | 10/1964 | Beaman, Jr. et al. | 56/13.6 |
| 3,503,274 | A | * | 3/1970 | Howard | 74/325 |
| 3,566,973 | A | * | 3/1971 | Blair et al. | 172/21 |
| 4,090,346 | A | * | 5/1978 | Doi | 56/13.6 |
| 4,188,833 | A | * | 2/1980 | Krauss et al. | 74/417 |
| 4,464,886 | A | * | 8/1984 | Carter | 56/13.8 |
| 5,179,822 | A | * | 1/1993 | McLean | 56/6 |
| 5,473,871 | A | * | 12/1995 | Fava et al. | 56/14.7 |
| 5,715,662 | A | * | 2/1998 | Walters | 56/6 |
| 5,761,891 | A | * | 6/1998 | Ferrari | 56/6 |
| 5,964,079 | A | * | 10/1999 | Mellin et al. | 56/13.6 |
| 6,026,635 | A | * | 2/2000 | Staiger | 56/295 |
| 6,260,339 | B1 | * | 7/2001 | Abend et al. | 56/14.7 |
| 6,672,043 | B2 | * | 1/2004 | Shibata et al. | 56/202 |
| 6,820,403 | B2 | * | 11/2004 | Umemoto | 56/10.8 |

FOREIGN PATENT DOCUMENTS

| JP | 2001045827 | 2/2001 |
| JP | 2003158907 | 6/2003 |
| JP | 2003274728 | 9/2003 |
| JP | 2003274729 | 9/2003 |
| JP | 2004154048 | 6/2004 |

* cited by examiner

*Primary Examiner* — Thomas Will
*Assistant Examiner* — Joan D Misa
(74) *Attorney, Agent, or Firm* — The Webb Law Firm (57) ABSTRACT

A rear discharge mower comprising: a first shaft; a first blade that is rotated in unison with the first shaft; a second shaft that is configured to be rotated in a direction opposite from a rotational direction of the first shaft; a second blade that is rotated in unison with the second shaft, wherein a grass-clippings discharge path is formed through which grass clippings are discharged in a rearward direction from the area between the first shaft and second shaft; an enclosing casing that supports the blade shafts; and a power train that is accommodated in the enclosing casing and that transmits power to the first and second blade shafts.

8 Claims, 8 Drawing Sheets

REAR DISCHARGE MOWER

BACKGROUND OF THE INVENTION

1. Field of the Invention

The present invention relates to an improvement of a rear discharge mower of a lawn mower, and a mid-mount type lawn mower that uses the rear discharge mower.

2. Description of the Related Art

This type of mid-mount type lawn mower that uses a rear discharge mower has, e.g., the following conventionally known structure.

A lawn mower is known in which a power transmission pulley and a power transmission belt are used as means to transmit power to a plurality of adjacently positioned blade shafts, in which one of the blade shafts and the shaft of the power transmission pulley for providing input to the blade shaft are structured as separate shafts in order to drive the two shafts in mutually reverse directions, and in which a set of gears is provided to ensure reverse rotation between the two shafts (see Japanese Laid-Open Patent Application (JP-A) 2003-274728 (Patent Document 1), for example).

A lawn mower is also known in which a power transmission pulley and a power transmission belt are used as means to transmit power to a plurality of adjacently positioned blade shafts, and in which a supplementary pulley is used convert the winding direction of the belt so that the internal peripheral surface side of the power transmission belt is wound around the power transmission pulley on one of the blade shafts, and the external peripheral surface side of the power transmission belt is wound around the power transmission pulley of another blade shaft, in order to drive the two shafts in mutually reverse directions (see Japanese Laid-Open Patent Application (JP-A) 2003-274729 (Patent Document 2), for example).

A lawn mower is further known in which motive power transmitted from an input shaft is branched at a pair of power transmission shafts to provide input to a gearbox disposed in the upper portion of left and right blade shafts and to transmit shaft power via a bevel gear mechanism or the like as a means to pivotally transmit power to a plurality of blade shafts in adjacent positions (see Japanese Laid-Open Patent Application (JP-A) 2003-158907 (Patent Document 3), for example).

In these kinds of rear discharge mowers, the blades are driven at a fairly high speed and high torque in order to discharge grass clippings in a rearward direction by generating airflow and producing a bouncing action that accompany the rotation of the blades.

If an attempt is made to convey the grass clippings toward the grass catcher in the rearward and upward directions without while minimizing a reduction in the movement energy in the grass clippings discharge direction, it is desirable to gradually change the movement of the grass clippings upward from the conveyance start area in which a conveyance action is imparted by the rotation of the blades across to the location where discharge begins on the rearward side where the conveyance action is completed. In order to accomplish this, it would be advantageous to gradually change the movement direction by beginning an upward slope of the grass-clippings discharge path from a position as near the front end of the mower deck as possible.

In models having a structure in which motive power is transmitted to the blade shafts using a belt as described in Japanese Laid-Open Patent Applications (JP-A) 2003-274728 and 2003-274729 noted above, the belt is used in a state of high belt tension. Therefore, the strength of the blade shaft support structure and the mower deck must be kept very high because the provision of a large distance between the mower deck and the power transmission pulley results in a situation in which a strong tension operates on the power transmission pulley in a position set at a distance from the mower deck, and there is a possibility that a bending moment will forcefully operate on the blade shaft. However) this is not practical in actual application in a mower deck composed of a thin metal plate because sufficient support strength cannot be obtained and the thickness of the mower deck must be unavoidably increased to assure strength, and other impractical structural modifications become necessary when attempting to set the power transmission pulley at a distance from the mower deck.

For this reason, in the arts described in Japanese Laid-Open Patent Applications (JP-A) 2003-274728 and 2003-274729 noted above, measures are taken in which the power transmission pulley is not placed at a distance from the mower deck, but rather a supplementary pulley is used to bring the power transmission belt between adjacent blade shafts to the front side of the mower deck to the extent possible, and the location at which the grass-clippings discharge path portion on the mower deck begins an upward movement is set further forward. However, since there is no change in the fact that the power transmission pulley remains in close proximity on the surface of the mower deck, the location at which upward motion starts must be provided further rearward to avoid [close] placement of the power transmission pulley and belt, and the location at which upward motion starts cannot be brought sufficiently forward.

Moreover, insofar as a belt is used as the transmission mechanism, some sort of blade reversal mechanism must be used between adjacent blade shafts, necessitating a dedicated set of gears or a redundant supplementary pulley for that purpose.

A structure is also conventionally known in which power transmission is branched by using a pair of power transmission shafts, a bevel gear mechanism, or the like in place of a structure using a belt and power transmission belt, as described in Japanese Laid-Open Patent Application (JP-A) 2003-158907.

In a structure that drives a bevel gear about the center of a horizontal shaft using a power transmission shaft in this manner, there are no drawbacks such as the generation of high tension between adjacent blade shafts, but the following problems arise because placement of a bevel gear with a rather large diameter is difficult on a mower deck that has little extra space.

The power transmission mechanism itself, which involves the meshing of bevel gears with each other, produces a relatively high level of noise in comparison with a power transmission mechanism composed of flat gears. In addition, there is a drawback when the bevel gear itself has a small diameter in that the noise in the gear meshing portion increases further due to the load that operates in a concentrated fashion on the meshing portion that has a small number of teeth. Also, a separate reverse rotation mechanism naturally becomes necessary.

SUMMARY OF THE INVENTION

An object of the present invention is to provide an improvement of this kind of conventional rear discharge mower.

The rear discharge mower according to the present invention comprises the following:

a first shaft;

a first blade that is rotated in unison with the first shaft;

a second shaft that is configured to be rotated in a direction opposite from a rotational direction of the first shaft;

a second blade that is rotated in unison with the second shaft, wherein a grass-clippings discharge path is formed through which grass clippings are discharged in a rearward direction from the area between the first shaft and second shaft as viewed from above;

an enclosing casing that pivotally supports the blade shafts; and a power train that is accommodated in the enclosing casing and that transmits power to the first and second blade shafts.

In accordance with configuration described above, a mower blade drive casing that supports adjacent blade shafts is provided. Therefore, a configuration is formed so as to have sufficient strength in order to support the two blade shafts, whereby the mower deck itself can be composed of a thin member that has strength in order to shape the intended blade rotation space.

In this embodiment, it is preferred that the enclosing casing have a first cylindrical shaft casing portion that at least partially encloses the first shaft, a second cylindrical shaft casing portion that at least partially encloses the second shaft, and a connecting casing portion that connects the first and second cylindrical shaft casings.

Since the connecting casing portion of the mower blade drive casing connects together the cylindrical shaft casing portions that support the blade shafts, the connecting casing portion can be disposed in a position that is set at a sufficient distance from the mower deck by suitably setting the length of the cylindrical shaft casing portions. Therefore, a starting end of the grass-clippings discharge path can be set nearer to the front end in the direction of the grass clippings conveyance on the top surface side of the mower deck without being affected by the existence of the connecting casing portion, and a grass-clippings discharge path with good grass clipping discharge performance can be formed.

In this embodiment, it is preferred that the enclosing casing enclose the first shaft, the second shaft, and the power train, from a front side, lateral sides, a rear side, and a top side.

In this embodiment, it is preferred that the power train be configured with a plurality of flat gears disposed in the connecting casing portion of the enclosing casing.

In this embodiment, it is preferred that the plurality of flat gears be disposed in the same plane.

In this embodiment, it is preferred that one of the flat gears be positioned above the grass-clippings discharge path, and the one flat gear be configured with a smaller diameter than the other flat gears in the power train.

In this embodiment, it is preferred that one of the flat gears be positioned above the grass-clippings discharge path, and the position of the axial center of rotation of the one flat gear be set to be more frontward than the axial center of rotation of the other flat gears in the power train.

In this embodiment, it is preferred that a flat gear to which external power is input be disposed in the connecting casing portion, an odd number of flat gears be provided to transmit power to the first blade shaft among the flat gears to which power is transmitted by meshing with the flat gear to which external power is input, and an even number of flat gears be provided to transmit power to the second blade shaft.

In this embodiment, it is preferred that each of the first and second blades be disposed so that a rotational trajectory of the first blade and a rotational trajectory of the second blade overlap each other, and respective rotational phases be mutually different.

DESCRIPTION OF THE PREFERRED EMBODIMENTS

An example of an embodiment of the present invention will be described below in detail with reference to the diagrams. A plurality of embodiments will be described below. It is to be understood that the combination of characteristics of one embodiment with the characteristics of another embodiment is included within the scope of the present invention.

[Configuration of the Lawn Mower]

Figure 1:
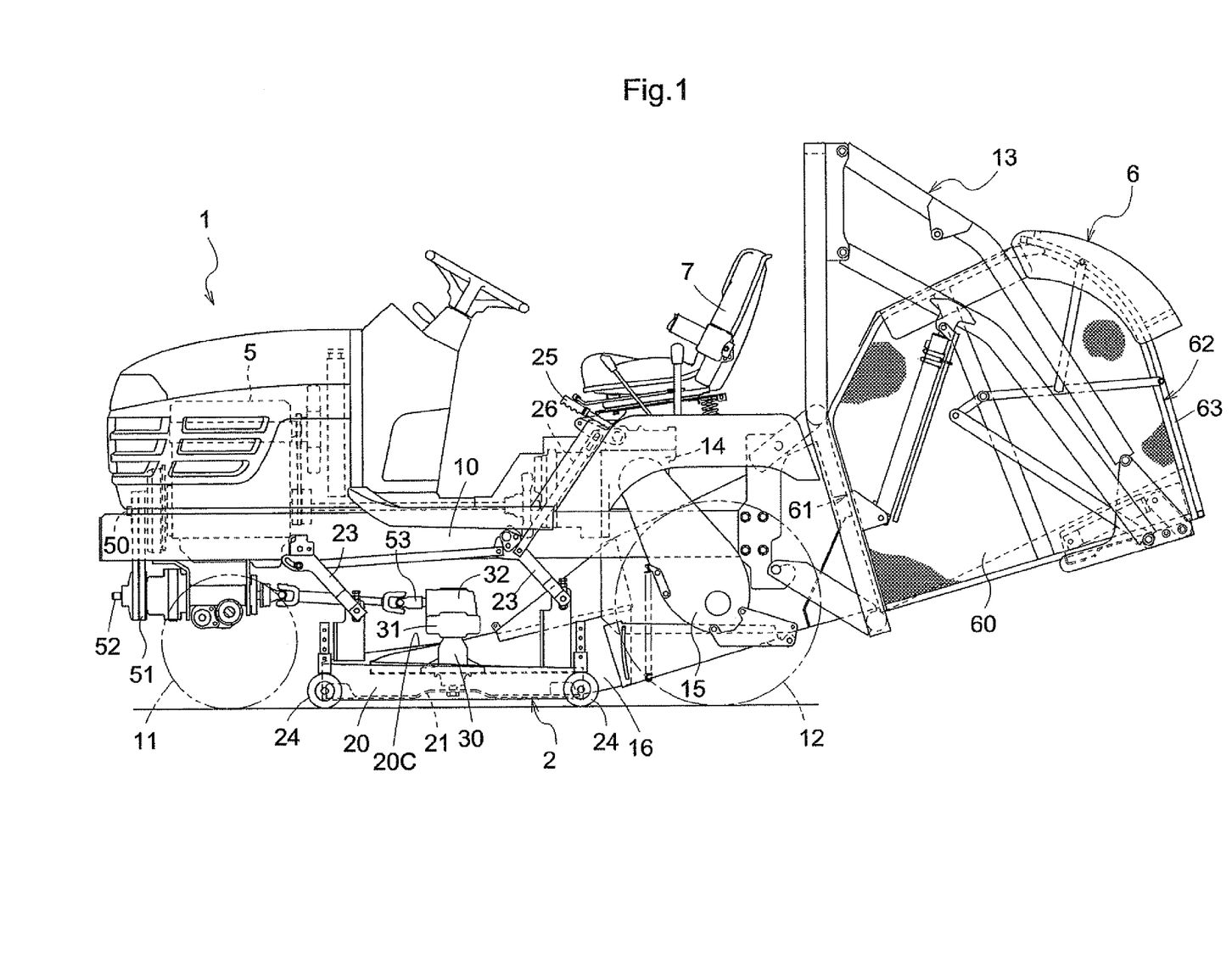
FIG. 1 is a diagram showing an overall side view of a mid-mount type lawn mower.
Figure 2:
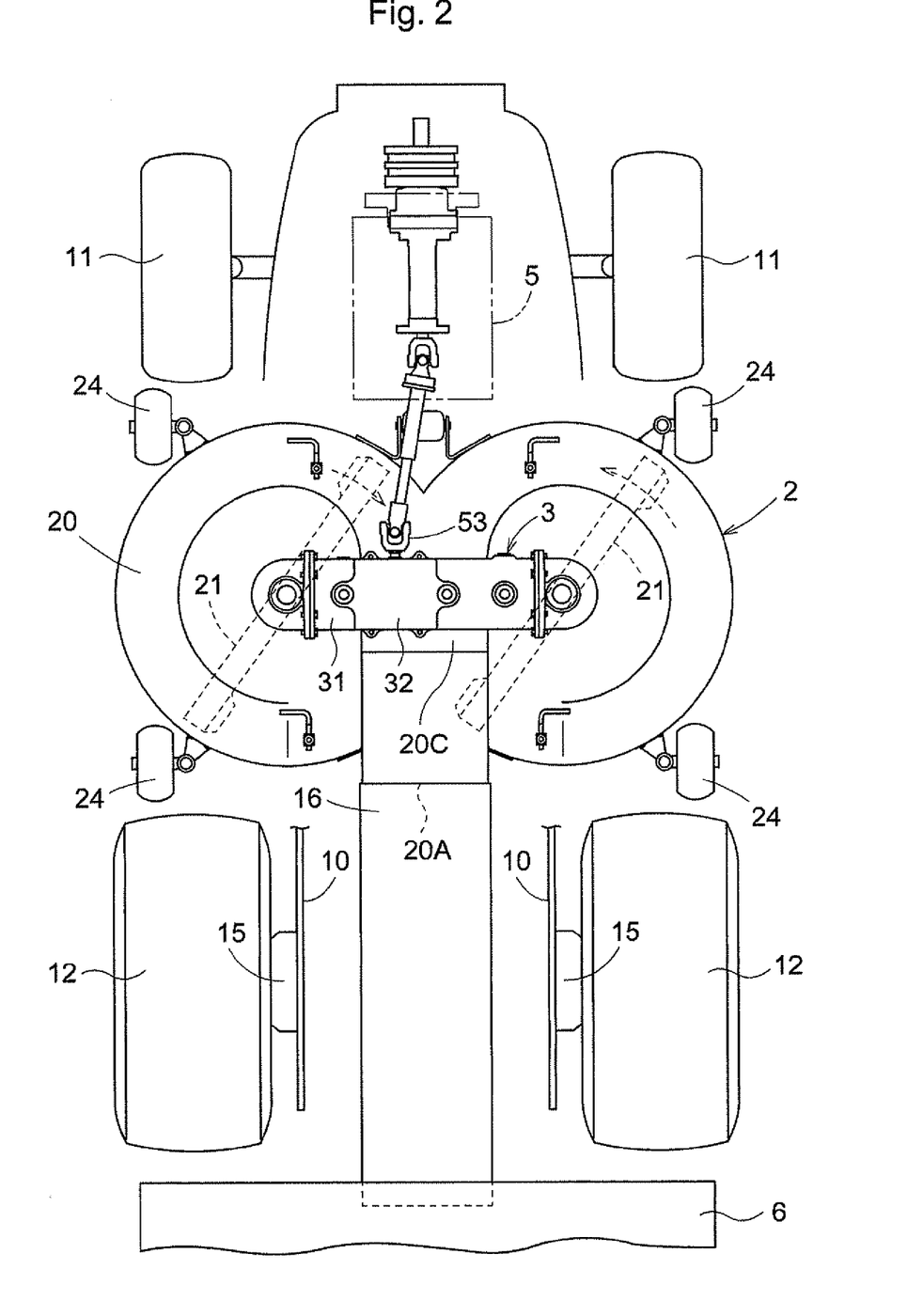
FIG. 2 is a diagram showing an overall plan view of a mid-mount type lawn mower.

FIGS. 1 and 2 show a riding-type, mid-mount type lawn mower as an example of a lawn mower provided with a rear discharge mower according to the present invention.

The lawn mower is configured with a mower 2 that is mounted in suspended fashion so as to be able to be raised and lowered between the front wheels 11 and the rear wheels 12 of a riding running carriage 1, while a grass catcher 6 is connected so as to be able to be raised and lowered to the rear section of the carriage via parallel four-point linking mechanisms 13.

An engine 5 is installed in the front of the running carriage 1, power taken from an output shaft 50 at the front portion of the engine 5 is transmitted via a belt transmission device 51 to an operating power take-off shaft 52 that is disposed below the front portion of the carriage, and power from the operating power take-off shaft 52 is transmitted by a shaft to the mower 2.

The rear wheels 12 are configured so that the right and left rear wheels 12 are each separately pivotably supported in a cantilevered state at the lower end of a pair of left and right rear wheel shaft casings 15 that protrude facing in the rearward downward direction from both the left and right sides of a transmission casing 14 that is secured to the carriage frame 10, and a duct 16 for discharging grass clippings is secured to a space that is formed between the left and right rear wheel shaft casings 15.

The grass catcher 6 is composed of a container main body 60 that is formed in the overall shape of a box and is provided with an entrance opening 61 that faces the running carriage 1 in the grass-catching position and is externally fitted and connected to the rear end of the duct 16, and an exit opening 62 that faces the opposite side of the entrance opening. The grass catcher is further composed of a rear portion lid 63 that can open and close the exit opening 62 formed in the container main body 60.

The grass catcher 6, which is connected by a linking mechanism 13 as described above, is configured to be able to change position between a grass-catching position connected to the duct 16 for conveying grass clippings from the running carriage 1 so as to collect grass clippings that are conveyed by the power of the airflow from the mower 2, which is installed on the running carriage 1, and a discharge position that is set at a distance from the duct 16.

[Mower Configuration]

Figure 3:
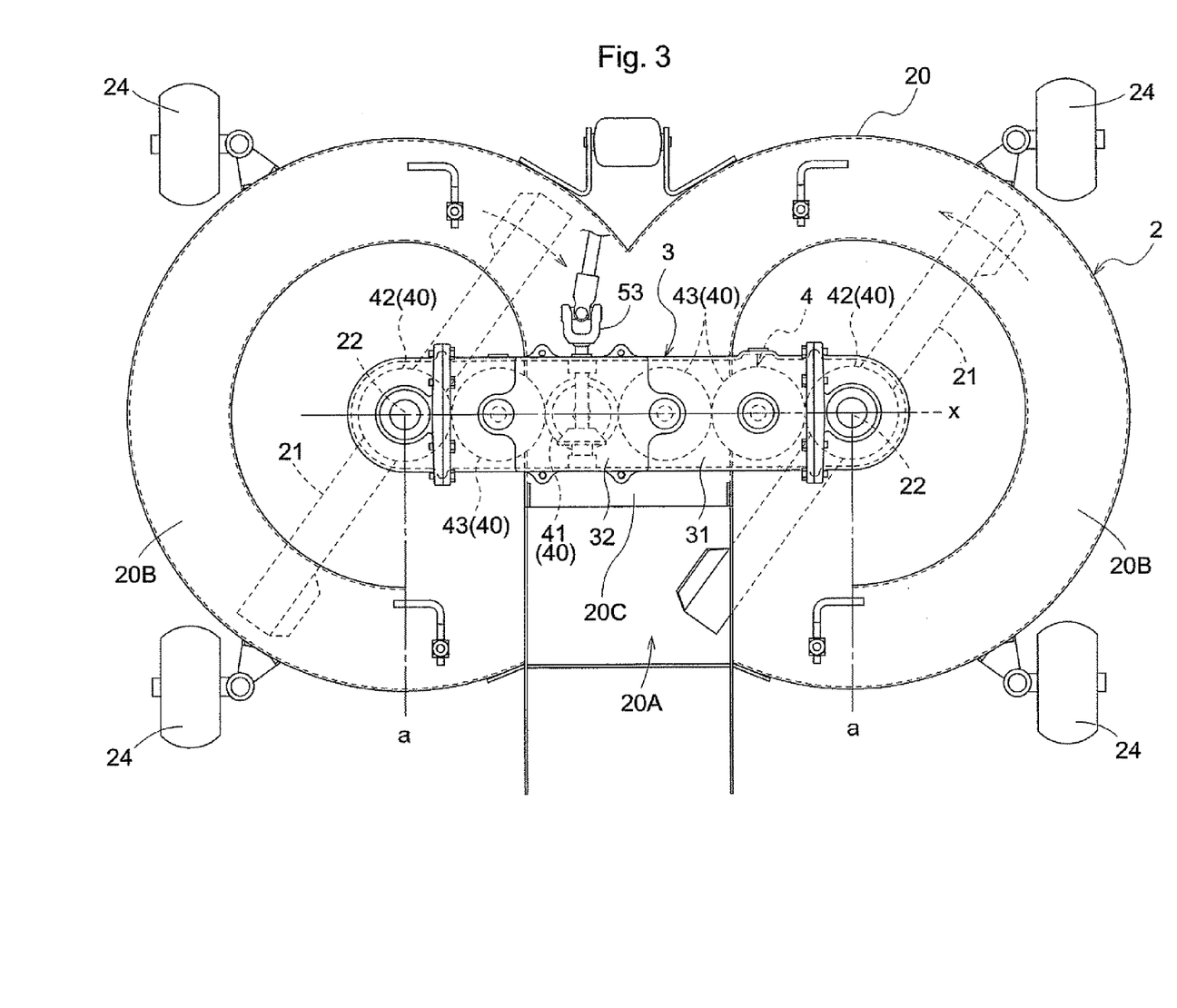
FIG. 3 is a diagram showing a plan view of a rear discharge mower.

The mower 2 has a structure in which two rotating blades 21 are arranged in a row to the left and right within a mower housing 20, as shown in FIGS. 2 and 3, and is formed as a rear discharge mower in which the left blade 21 is driven in a clockwise direction, and the right blade 21 is driven in a counterclockwise direction, whereby grass clippings ride on a conveying airflow generated by the rotation of the blades 21 and are discharged from an exit 20A formed near the rear center portion of the mower housing 20. The grass clippings discharged from the exit 20A are brought to the grass catcher 6 via the duct 16 disposed between the left and right rear wheels 12.

The mower 2 is configured so that the upper end side is elevatably suspended and connected to the lower end side of a pair of front and rear swinging links 23 that are pivotally connected to the carriage frame 10, and so that the mower will run with gauge wheels 24, which are provided to the lower end portion of the mower housing 20, in a state of contact with the ground in when operated to clip grass.

Among the swinging links 23, a portion of the rear swinging link 23 is connected and interlocked via a connecting rod 26 to a raising and lowering operation lever 25 located to the side of a driver seat 7 that is provided to the top of the carriage frame 10, and is configured to allow manual raising or lowering operation by swingably operating the raising and lowering operational lever 25.

Figure 4:
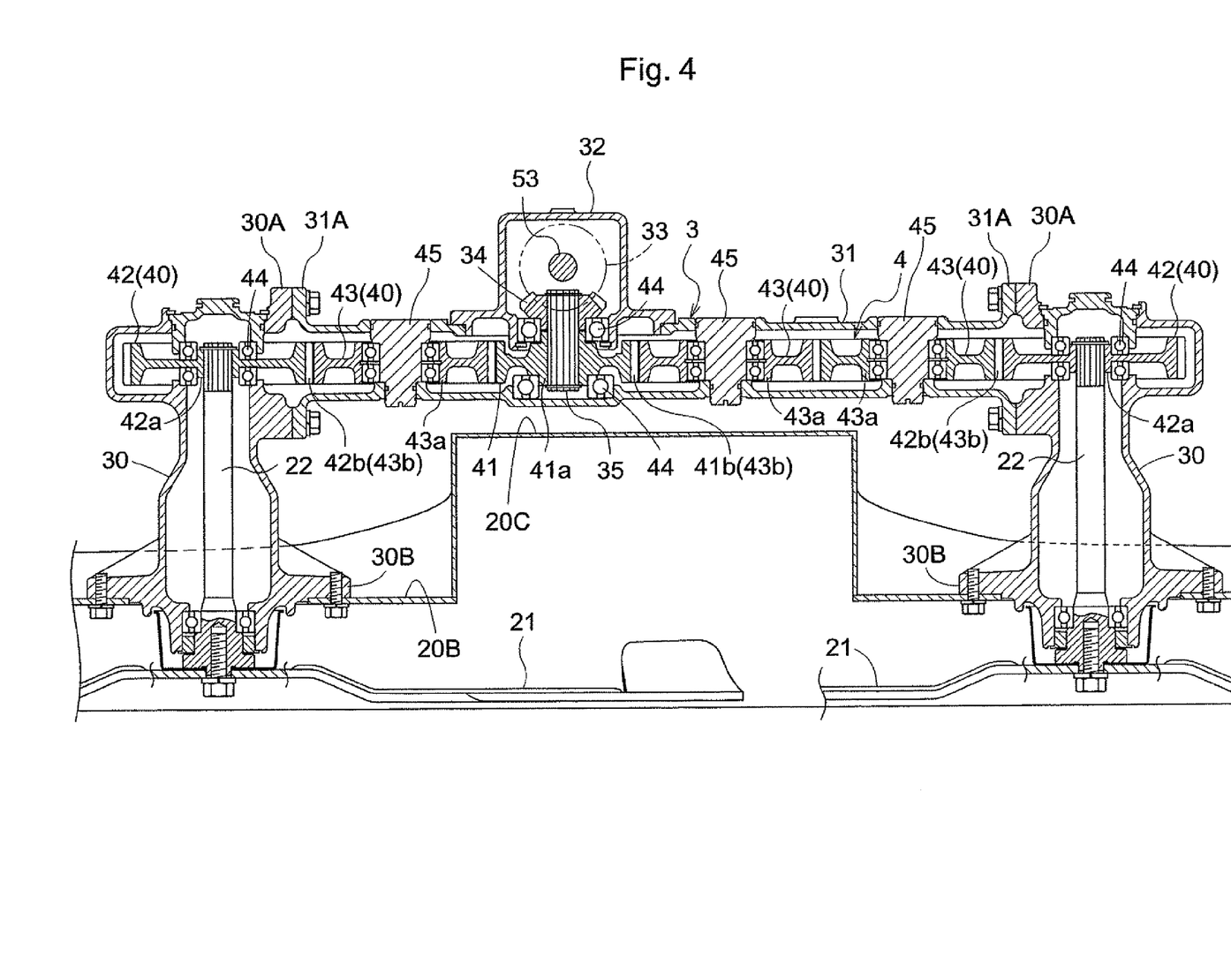
FIG. 4 is a longitudinal sectional view in the lateral direction showing a power transmission system of a rear discharge mower.
Figure 5:
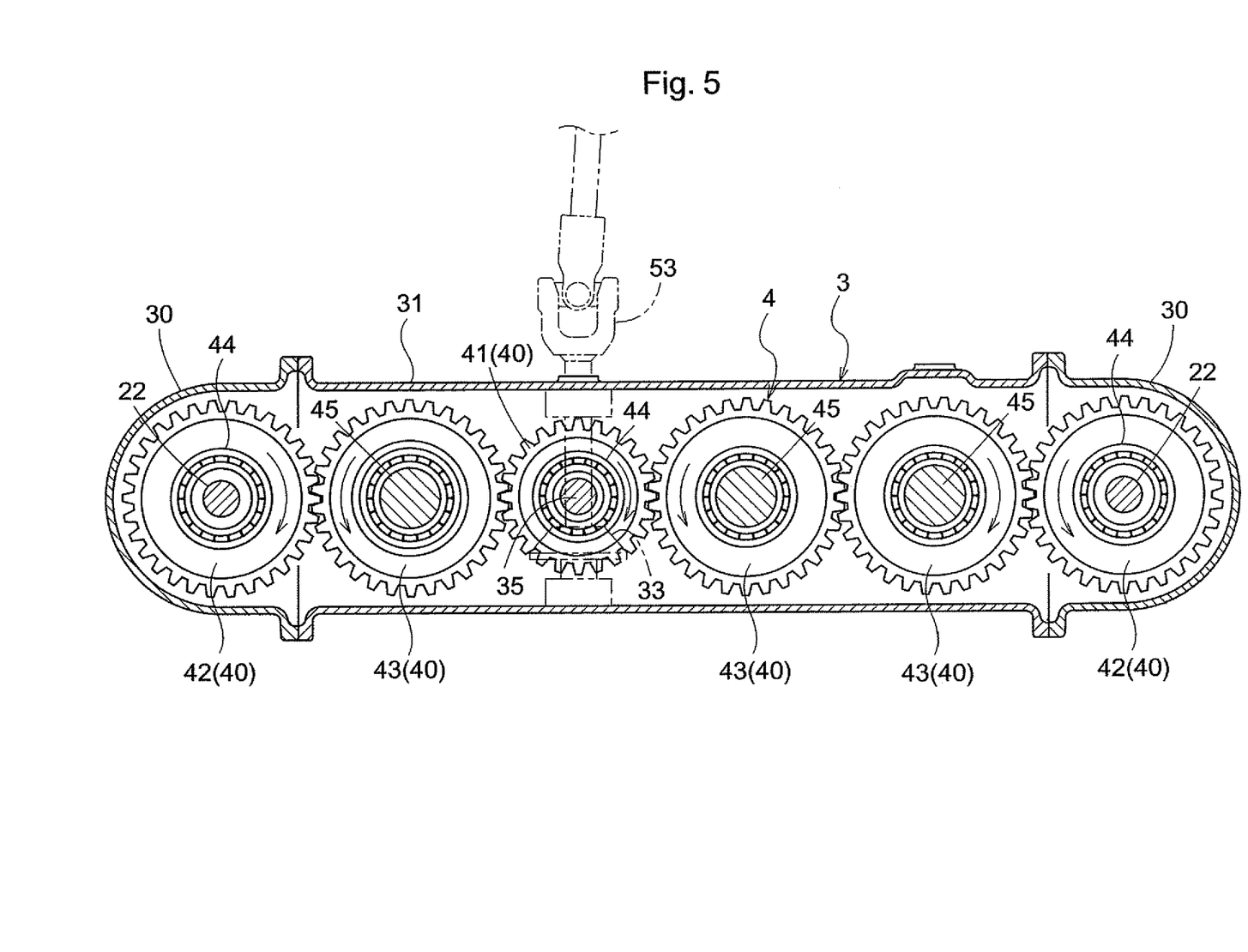
FIG. 5 is a transverse sectional view in the horizontal direction showing the power transmission system of a rear discharge mower.

Blade shafts 22 that support the right and left blades 21 of the mower 2 are mutually connected and interlocked via a power train 4 composed of a set of gears that is composed of flat gears 40 housed in a mower blade drive casing 3, as shown in FIGS. 3 through 5. The mower blade drive casing 3 is an example of an enclosing casing.

The mower blade drive casing 3 is composed of cylindrical shaft casings 30 that enclose the blade shafts 22, and a connecting casing 31 that connects the top end sides of the cylindrical shaft casings 30, thereby forming a gate-shaped construction as shown in FIG. 4. The flat gears 40 for power transmission are housed in the interior space of the connecting casing 31.

A gear box 32 is secured to an intermediate portion of the connecting casing 31. The gear box 32 is provided with a bevel gear 33 that is formed on the end of the power train shaft 53, which is connected to the operating power take-off shaft 52 on the front side of the carriage, and an input shaft 35 in which a bevel gear 34 that meshes with the bevel gear 33 is provided to the end of the shaft.

A boss section 41a of an input flat gear 41 fitted over a spline formed on the portion of the power input shaft 35 that projects from the gear box 32 is supported by a shaft via ball bearings 44 in an intermediate section of the connecting casing 31, and an odd number of relaying flat gears 43, i.e., a single such gear, is disposed between the input flat gear 41 and the output flat gear 42 fitted over a spline on the shaft ends of one of the blade shafts 22. An even number of flat gears 43, i.e., two such gears, are disposed between the input flat gear 41 and the output flat gear 42 fitted over a spline on the end of the other blade shaft 22.

The flat gears 40 that constitute the power train 4 are composed of the flat gears 41, 42, and 43. The right and left blades 21 that are connected and interlocked using the power train 4, which is composed of the flat gears 40 in this manner, are disposed so that the rotating track of each blade partially overlaps the other, but the blades are mutually offset in phase in the manner shown in FIG. 3 and assembled so that collision between the blades 21 is avoided.

Among the flat gears 41, 42, and 43, the flat gears 41 and 42 for input and output have boss sections 41a and 42a that are each rest on bearings inside the connecting casing 31 via ball bearings 44. Also, splines are formed at the input locations and the output locations on the internal peripheral side of the boss sections 41a and 42a of the power input and output flat gears 41 and 42, and the boss sections are configured to be able to be inserted and removed with respect to the power input shaft 35 in which splines are formed and the upper end section of the blade shaft 22.

The boss sections 41a, 42a, and 43a and the teeth sections 41b, 42b, and 43b of the flat gears 41, 42 and 43, are formed to be thick, but the hub portions between these sections are formed to be thin.

A pivot support shaft 45 for the relaying flat gears 43 has a maximum diameter at the upper end portion, the medial portion of the shaft supported by bearings has a smaller diameter than the upper end portion, and the lower end side is formed to a smaller diameter smaller than the internal diameter of the bearing, and is configured to be able to be inserted and removed from above.

The cylindrical shaft casings 30 that house the blade shafts 22 and the connecting casing 31 are separately formed, but are configured to be integrally connected by bolts at the connecting flange sections 30A and 31A formed at the ends of each casing. The lower ends of the cylindrical shaft casings 30 are formed so that the diameter of the corresponding portions of the cylindrical shaft casings is greater than that of the upper end side; even larger flange parts 30B are formed integrally with the lower ends; and the assembly is connected by bolts to the mower deck 20B.

The mower blade drive casing 3 is thus easy to assemble because the mower deck 20B need only be bolted together in a completely assembled state.

Figure 6:
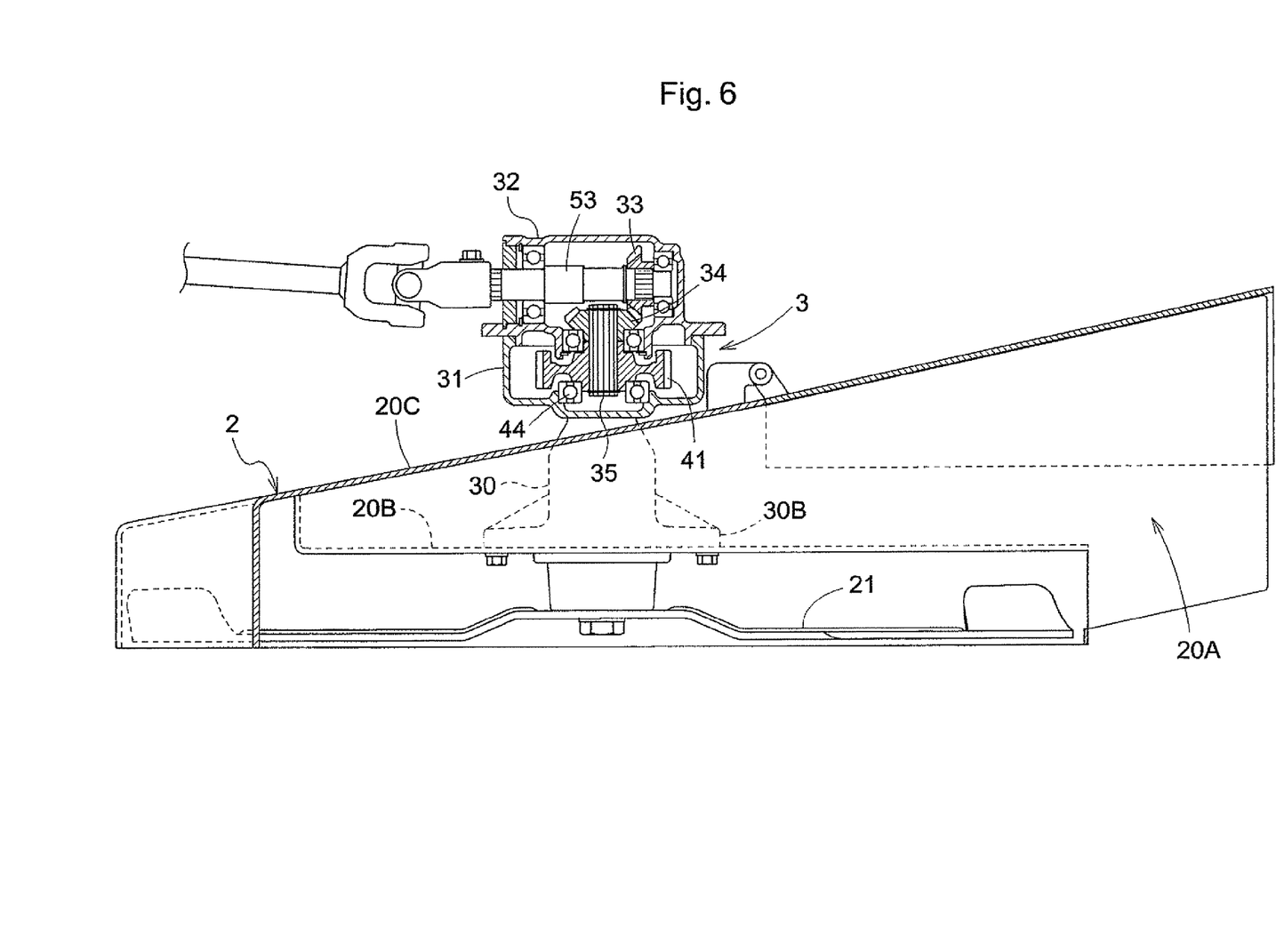
FIG. 6 is a longitudinal sectional view in the longitudinal direction showing the power transmission system of a rear discharge mower.
Figure 7:
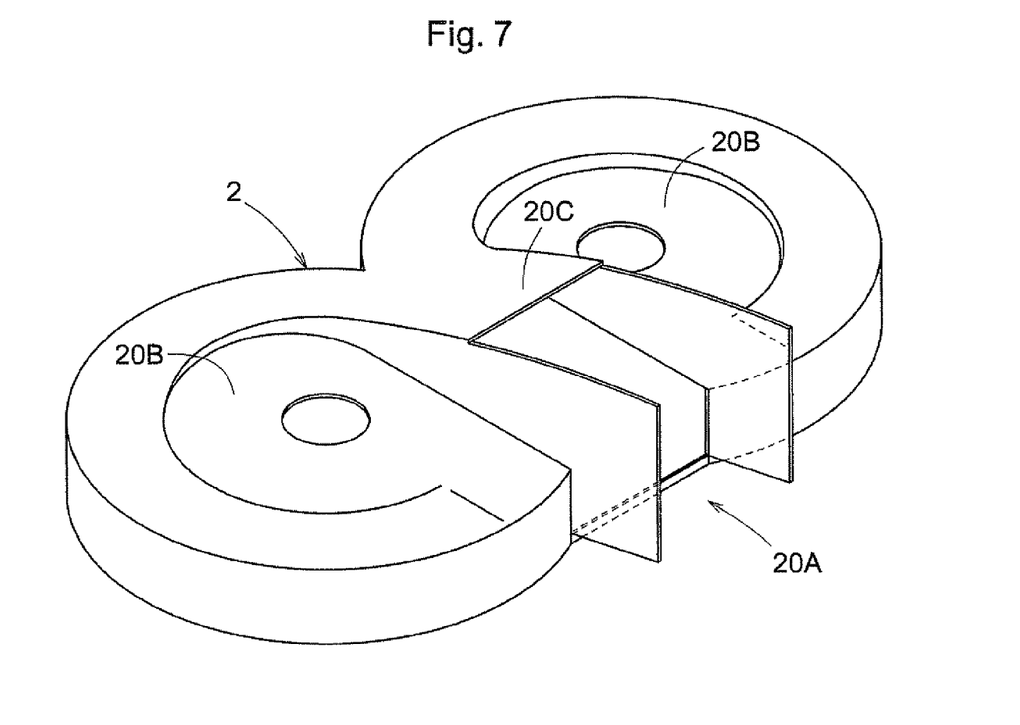
FIG. 7 is a perspective view showing the housing of a rear discharge mower.

A protruding section 20C that protrudes upward in a gradual fashion from the vicinity of the point a in FIG. 3 is formed on a deck 20B portion of the mower housing 20 in the vicinity of the external peripheral edge of the mower deck 2013, as shown in FIGS. 3, 6, and 7. Assuming that an imaginary line x that connects the axial centers of the two blade shafts 22 together is the start location of grass clippings discharge, the protruding section 20C forms a gradually upward-sloping surface across about ¾ of the circumference and is configured to smoothly hand off grass clippings to the duct 16 that trails the exit 20A.

Other Embodiments

Other embodiments of the present invention will be listed next.

[1] In regard to the configuration of the mower blade drive casing 3, the cylindrical shaft casings 30 and the connecting casing 31 may be integrally formed overall and may be configured using a partially open section or an opening and closing lid as a structure for removing and inserting the flat gears 40 as well as various shafts and other components of the power train 4, though these possibilities are not depicted in the diagrams.

Figure 8:
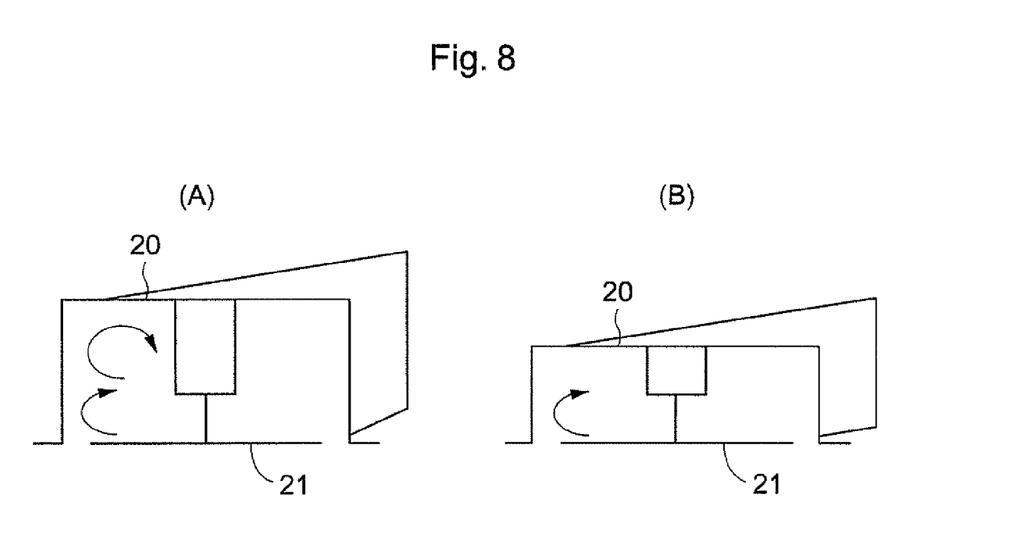
FIG. 8 is an explanatory diagram showing another embodiment of the housing of a rear discharge mower.

[2] In FIG. 8A, the internal height of the mower housing 20 is set to be greater, e.g., about 1.2 times to 1.5 times greater than in the ordinary configuration shown in FIG. 8B. When the height of the mower housing 20 is set greater in this manner, the grass clippings can be more finely shredded because the grass clippings are carried about inside the housing 20 for a long period of time.

Figure 9:
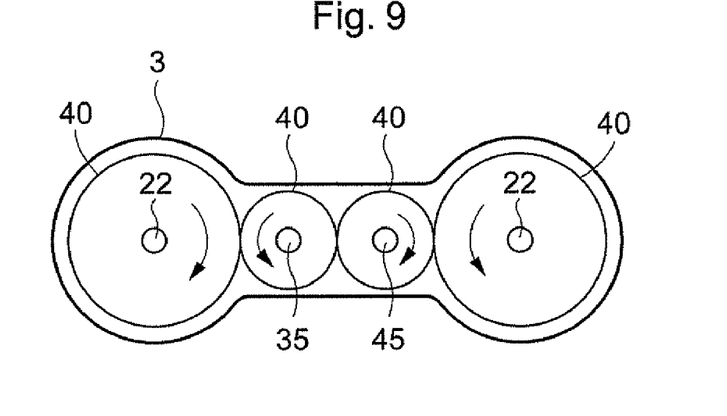
FIG. 9 is an explanatory diagram in a plan view showing another embodiment of the power transmission system of a rear discharge mower.

[3] The layout of the flat gears 40 is not limited to a configuration in which all the flat gears 40 have substantially the same diameter in the manner of the embodiment described above. For example, the flat gears 40 that are positioned above the overlapping location of the rotating track of the two blades 21 may be configured as flat gears 40 that have a smaller diameter than the flat gears 40 of the blade shaft 22 portion, as shown in FIG. 9.

When the flat gears 40 positioned above the overlapping location of the rotating track of the two blades 21 are configured in this manner by using a flat gear 40 that has a smaller diameter than the flat gears 40 of the blade shaft 22 portions, the connecting casing 31 portion of the location in which the smaller diameter flat gear 40 is housed can be formed in a shape in which the outside peripheral wall of the casing is brought inward so as to be moved closer to the small diameter flat gear 40 as viewed from above. It then follows that the connecting casing 31 is arranged so that the portion that has been brought inward is positioned above the grass-clippings discharge path in which grass clippings are discharged in a rearward direction through a space between the right and left blade shafts 22. As a result, the rear end of the connecting casing 31 can be shifted as far forward as possible so that the slope start end portion of the grass-clippings discharge path can be brought as far forward as possible and disposed in the direction in which grass clippings are conveyed.

Figure 10:
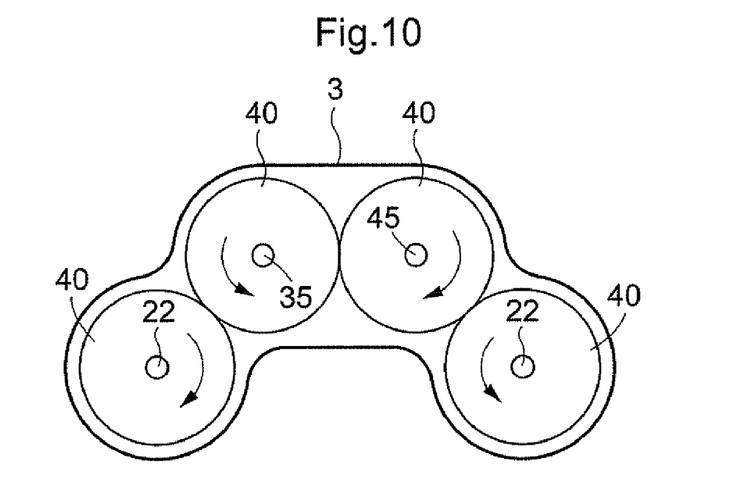
FIG. 10 is an explanatory diagram in a plan view showing another embodiment of the power transmission system of a rear discharge mower.

[4] The layout of the flat gears 40 is not limited to one in which the entire configuration is arranged in a single straight line as viewed from above, as described above in embodiment [3]. For example, the entire configuration may be arranged along a curved line segment so that the flat gears 40 that are positioned forward of the overlapping location of the rotating track of both blades 21 are positioned further forward than the flat gears 40 of the of the blade shaft 22 portion, as shown in FIG. 10.

In this case as well, the rear end edge of the connecting casing 31 can be brought as far forward as possible so that the connecting casing 31, which is disposed so as to be positioned above the grass-clippings discharge path in which grass clippings are discharged in a rearward direction through a space between the right and left blade shafts 22, can, as a result, be disposed so that the slope start end portion of the grass-clippings discharge path is brought as far forward as possible in the grass clippings conveyance direction.

Figure 11:
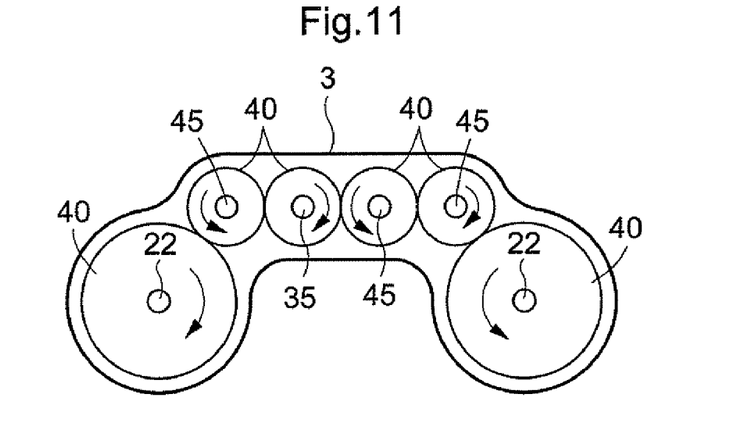
FIG. 11 is an explanatory diagram in a plan view showing another embodiment of the power transmission system of a rear discharge mower.

[5] The layout of the flat gears 40 is not limited to one in which the entire configuration is composed of flat gears 40 having substantially the same diameter and is arranged in a single straight line as viewed from above, as in the embodiment described above. For example, the flat gears 40 that are positioned forward of the overlapping location of the rotating track of the two blades 21 may have a smaller diameter than the other flat gears 40, and may be disposed along a curved line segment so as to be positioned further forward than the flat gears 40 of the blade shaft 22 portions, as shown in FIG. 11.

In this case as well, the rear end edge of the connecting casing 31 can be shifted as far forward as possible.

[6] The layout of the flat gears 40 is not limited to one in which the entire configuration is disposed in a single plane, as described in the embodiments above, and the set of gears constituting the power train 4 may, e.g., be provided in a plurality of upper and lower levels, though this possibility is not depicted in the diagrams.

[7] The power drive 4 disposed in the mower blade drive casing 3 is not limited to one in which flat gears 40 are used as described in the embodiments above, and power transmission belts and power transmission shafts may be used.

What is claimed is:

1. A mower comprising:
  a first shaft;
  a first blade mounted on the first shaft to be rotated in unison with the first shaft;
  a second shaft, the first shaft and the second shaft rotating in opposite directions to each other;
  a second blade mounted on the second shaft to be rotated in unison with the second shaft, wherein a grass clippings discharging path extends rearward through an area between the first shaft and the second shaft as viewed from above for discharging grass having been cut by the first blade and the second blade;
  a mower housing, the mower housing including:
    a mower deck covering the first blade and the second blade from above; and
    a protruding section protruded from the mower deck to define the grass clippings discharging path;
  an enclosing casing pivotally supporting each of the first blade and the second blade, the enclosing casing including:
    a first cylindrical shaft casing standing erect from the mower deck to enclose the first shaft;
    a second cylindrical shaft casing standing erect from the mower deck to enclose the second shaft; and
    a connecting casing interconnecting an upper end of the first cylindrical shaft casing and an upper end of the second cylindrical shaft casing, wherein the first cylindrical shaft casing, the connecting casing and the second cylindrical shaft casing form a gate-shaped structure on the mower deck, the protruding section being accommodated in a space defined by the gate-shaped structure and the mower deck; and
  a power train extending through the connecting casing to transmit power to the first shaft and the second shaft, the power train including:
    an input shaft projecting upward through the connecting casing, an input flat gear being journaled on the input shaft within the connecting casing;
    a plurality of pairs of upper/lower holes defined on the connecting casing, the holes including upper holes defined on a top wall of the connecting casing and lower holes defined on a bottom wall of the connecting casing to be aligned with the respective upper holes;
    a plurality of pivot support relay shafts removably inserted from above through the respective upper/lower holes to be attached to the connecting casing and configured to transmit power from the input shaft to the first shaft and the second shaft, a flat relay gear being journaled on each of the pivot support relay shafts within the connecting casing, wherein each of the upper holes has a larger diameter than each of the lower holes aligned therewith,
    each of the pivot support relay shafts has an upper end shank portion, an intermediate shank portion and a lower end shank portion, a diameter of the upper end shank portion being larger than a diameter of the intermediate shank portion, and the diameter of the intermediate shank portion being larger than a diameter of the lower end shank portion, the pivot support relay shafts are removably inserted from above through the respective upper holes, the upper end shank portion being fitted in the upper hole associated therewith and the lower end shank portion being fitted in the lower hole associated therewith;

a first output flat gear journaled on an upper end of the first shaft; and a second output flat gear journaled on an upper end of the second shaft;

wherein the input shaft, the respective pivot support relay shafts, the first shaft, and the second shaft extend vertically and parallel to one another, and wherein the input flat gear, the respective flat relay gears, the first output flat gear, and the second output flat gear are aligned at a same level to transmit the power horizontally.

2. The mower as defined in claim 1, wherein at least one of the flat relay gears positioned above the grass-clippings discharge path has a diameter thereof smaller than the other flat relay gears of the power train.

3. The mower as defined in claim 1, wherein at least one of the flat relay gears positioned above the grass-clippings discharge path has a rotation axis thereof located more forwardly than rotation axes of the other flat relay gears of the power train.

4. The mower as defined in claim 1, wherein one of the flat relay gears inputs external power into the connecting casing portion, an odd number of the flat relay gears being provided to transmit the power to the first blade shaft, and an even number of the flat relay gears being provided to transmit the power to the second blade shaft.

5. The mower as defined in claim 1, wherein a rotational trajectory of the first blade and a rotational trajectory of the second blade overlap with each other, and a rotational phase of the first blade and a rotational phase of the second blade are different from each other.

6. A mower comprising:

a first shaft;

a first blade mounted on the first shaft to be rotated in unison with the first shaft;

a second shaft, the first shaft and the second shaft rotating in opposite directions to each other;

a second blade mounted on the second shaft to be rotated in unison with the second shaft, wherein a grass clippings discharging path extends rearward through an area between the first shaft and the second shaft as viewed from above for discharging grass having been cut by the first blade and the second blade;

a mower housing, the mower housing including:

a mower deck covering the first blade and the second blade from above; and a protruding section protruded from the mower deck to define the grass clippings discharging path;

an enclosing casing pivotally supporting each of the first blade and the second blade, the enclosing casing including:

a first cylindrical shaft casing standing erect from the mower deck to enclose the first shaft;

a second cylindrical shaft casing standing erect from the mower deck to enclose the second shaft; and a connecting casing interconnecting an upper end of the first cylindrical shaft casing and an upper end of the second cylindrical shaft casing, wherein the first cylindrical shaft casing, the connecting casing and the second cylindrical shaft casing form a gate-shaped structure on the mower deck, the protruding section being accommodated in a space defined by the gate-shaped structure and the mower deck; and a power train extending through the connecting casing to transmit power to the first shaft and the second shaft, the power train including:

an input shaft projecting upward through the connecting casing, an input flat gear being journaled on the input shaft within the connecting casing;

a plurality of pairs of upper/lower holes defined on the connecting casing, the holes including upper holes defined on a top wall of the connecting casing and lower holes defined on a bottom wall of the connecting casing to be aligned with the respective upper holes, a diameter of each of the upper holes being larger than a diameter of each of the lower holes;

a plurality of pivot support relay shafts extending between the first shaft and the second shaft to transmit power from the input shaft to the first and second shaft, a flat gear being journaled on each of the pivot support relay shafts within the connecting casing, wherein each of the pivot support relay shafts comprises a stepped shaft having a larger-diameter first stepped portion having a diameter thereof corresponding to the diameter of an associated upper hole of said upper holes, and a smaller-diameter second stepped portion having a diameter thereof corresponding to the diameter of an associated lower hole of said lower holes, and wherein the pivot support relay shafts are removably attached to the connecting casing from above through the respective upper holes, and, after attachment to the connecting casing, the smaller-diameter second stepped portion of each of the pivot shafts faces a space defined by the gate-shaped structure and the mower deck;

a first output flat gear journaled on an upper end of the first shaft; and a second output flat gear journaled on an upper end of the second shaft;

wherein the input shaft, the respective pivot support relay shafts, the first shaft, and the second shaft extend vertically and parallel to one another, and wherein the input flat gear, the respective flat gears, the first output flat gear, and the second output flat gear are aligned at a same level to transmit the power horizontally.

7. A mower comprising:

a first shaft;

a first blade rotated in unison with the first shaft;

a second shaft, the first shaft and the second shaft rotating in opposite directions to each other;

a second blade rotated in unison with the second shaft, wherein a grass clippings discharging path extends rearward through an area between the first shaft and the second shaft as viewed from above for discharging grass having been cut by the first blade and the second blade;

a mower housing, the mower housing including:

a mower deck covering the first blade and the second blade from above; and a protruding section protruded from the mower deck to define the grass clippings discharging path;

an enclosing casing pivotally supporting each of the first blade and the second blade, the enclosing casing including:

a first cylindrical shaft casing standing erect from the mower deck to enclose the first shaft;

a second cylindrical shaft casing standing erect from the mower deck to enclose the second shaft; and a connecting casing interconnecting an upper end of the first cylindrical shaft casing and an upper end of the second cylindrical shaft casing, wherein the first cylindrical shaft casing, the connecting casing and the second cylindrical shaft casing form a gate-shaped structure on the mower deck, the protruding section being accommodated in a space defined by the gate-shaped structure and the mower deck; and a power train extending through the connecting casing to transmit power to the first shaft and the second shaft, the power train including:

a plurality of flat gears disposed horizontally in the connecting casing;

a plurality of pairs of upper/lower holes defined on the connecting casing, the holes including upper holes defined on a top wall of the connecting casing and lower holes defined on a bottom wall of the connecting casing to be aligned with the respective upper holes;

a plurality of pivot support shafts removably inserted through the respective upper/lower holes to be attached to the connecting casing, the respective flat gears being journaled on the pivot support shafts, wherein each of the upper holes has a larger diameter than each of the lower holes aligned therewith, each of the pivot support shafts has an upper end shank portion, an intermediate shank portion and a lower end shank portion, a diameter of the upper end shank portion being larger than a diameter of the intermediate shank portion, and the diameter of the intermediate shank portion being larger than a diameter of the lower end shank portion, the pivot support shafts are removably inserted through the respective upper holes, and the upper end shank portion is fitted in the upper hole associated therewith and the lower end shank portion is fitted in the lower hole associated therewith; and a bearing disposed between an outer periphery of each of the pivot support shafts and an inner wall of the flat gear associated with the pivot support shaft, wherein an inner wall of the bearing is contacted with the intermediate shank portion of the pivot support shaft associated therewith, a top side of the bearing is contacted with a lower side of the upper end shank portion of the pivot support shaft associated therewith, and a bottom side of the bearing is contacted with a bottom wall of the connecting casing.

8. The mower as defined in claim 7, wherein a height of the bearing, a height of each of the flat gears, and a vertical length of the intermediate shank portion are equal to one another.

\* \* \* \* \*